(12) United States Patent
Chandler et al.

(10) Patent No.: US 12,357,855 B2
(45) Date of Patent: Jul. 15, 2025

(54) AI-DRIVEN OFF-GRID FIRE PREVENTION SYSTEM AND METHOD

(71) Applicant: Vigillent Inc, Santa Barbara, CA (US)

(72) Inventors: Kevin Joseph Chandler, San Diego, CA (US); Christopher Corgan Troye, Brentwood, CA (US)

(73) Assignee: Vigillent Inc, Santa Barbara, CA (US)

( * ) Notice: Subject to any disclaimer, the term of this patent is extended or adjusted under 35 U.S.C. 154(b) by 0 days.

(21) Appl. No.: 18/420,115

(22) Filed: Jan. 23, 2024

(65) Prior Publication Data

US 2024/0157179 A1 May 16, 2024

Related U.S. Application Data

(63) Continuation of application No. 17/585,662, filed on Jan. 27, 2022, now Pat. No. 11,911,640.

(51) Int. Cl.
*A62C 3/00* (2006.01)
*A62C 35/02* (2006.01)
*G06N 20/00* (2019.01)

(52) U.S. Cl.
CPC .............. *A62C 3/00* (2013.01); *A62C 35/02* (2013.01); *G06N 20/00* (2019.01)

(58) Field of Classification Search
CPC .................................. A62C 3/00; A62C 35/02
See application file for complete search history.

(56) References Cited

U.S. PATENT DOCUMENTS

| 5,400,688 | A  | * | 3/1995  | Eninger ................ F41H 11/02 89/36.12 |
| 7,066,273 | B2 | * | 6/2006  | Tan ....................... A62C 37/40 169/41 |
| 7,451,028 | B2 | * | 11/2008 | Pillar ..................... B65F 3/045 239/165 |
| 8,606,373 | B2 | * | 12/2013 | Lozier ................... A62C 37/00 169/56 |
| 8,714,466 | B2 | * | 5/2014  | Trapp ..................... B05B 3/02 239/587.2 |
| 9,403,046 | B2 | * | 8/2016  | Schmitt ................. A62C 35/68 |
| 10,042,086 | B1 | * | 8/2018  | Smalley ................. G01J 5/00 |
| 10,152,877 | B2 | * | 12/2018 | Linder ................... G08B 1/08 |
| 10,512,809 | B2 | * | 12/2019 | Gladstone ............. A62C 31/24 |

(Continued)

*Primary Examiner* — Joseph A Greenlund
(74) *Attorney, Agent, or Firm* — Boon Intellectual Property Law, PLLC; Brian S. Boon

(57) ABSTRACT

A system and method for protecting an area from fire having one or more area fire prevention units capable of discharging fire suppressant via a directable nozzle, each fire prevention unit being communicatively coupled to a computing device which detects airborne firebrands, predicts their trajectories and final landing positions, and directs one or of the fire prevention units to discharge fire suppressant toward the firebrand at its final landing position. Depending on configuration, the system may further use wind data, GPS, and terrain models to calculate the trajectory and final position of the firebrand. Also depending on configuration, the system may calculate a spread and distance of suppressant discharge, a nozzle aperture, and an amount of suppressant to discharge. Some embodiments may use trained machine learning algorithms to make one or more of the system's calculations.

14 Claims, 16 Drawing Sheets

(56) References Cited

U.S. PATENT DOCUMENTS

| | | | | |
|---|---|---|---|---|
| 10,665,074 B1* | 5/2020 | Kausek | | B05B 3/021 |
| 10,758,758 B2* | 9/2020 | Schmitt | | A62C 37/36 |
| 10,814,150 B2* | 10/2020 | Conboy | | A62C 37/50 |
| 11,027,162 B2* | 6/2021 | Orglmeister | | A62C 37/40 |
| 11,043,095 B1* | 6/2021 | Derickson | | G08B 31/00 |
| 11,237,297 B1* | 2/2022 | Smalley | | G01J 5/0014 |
| 11,255,324 B2* | 2/2022 | Flaster | | G08B 25/10 |
| 11,369,820 B2* | 6/2022 | Gladstone | | H04N 7/188 |
| 11,438,886 B2* | 9/2022 | Chen | | G01S 17/89 |
| 2004/0163827 A1* | 8/2004 | Privalov | | G08B 17/005 |
| | | | | 239/69 |
| 2004/0199302 A1* | 10/2004 | Pillar | | B65F 3/045 |
| | | | | 701/1 |
| 2005/0273279 A1* | 12/2005 | Faltesek | | A62C 99/009 |
| | | | | 702/51 |
| 2008/0215190 A1* | 9/2008 | Pillar | | B60T 17/221 |
| | | | | 701/1 |
| 2010/0071917 A1* | 3/2010 | Lalouz | | A62C 3/0214 |
| | | | | 169/60 |
| 2013/0199806 A1* | 8/2013 | Zimmerman | | A62C 31/12 |
| | | | | 169/53 |
| 2015/0021054 A1* | 1/2015 | McNamara | | A62C 35/023 |
| | | | | 169/61 |
| 2015/0070192 A1* | 3/2015 | Kates | | G08B 21/14 |
| | | | | 340/870.39 |
| 2015/0161793 A1* | 6/2015 | Takahashi | | A61N 5/1077 |
| | | | | 600/1 |
| 2015/0306618 A1* | 10/2015 | Petter | | B05B 1/12 |
| | | | | 239/69 |
| 2016/0030784 A1* | 2/2016 | Tsutaki | | A62C 3/0292 |
| | | | | 169/61 |
| 2016/0059057 A1* | 3/2016 | Disimile | | A62C 31/05 |
| | | | | 169/46 |
| 2016/0121151 A1* | 5/2016 | Schmitt | | A62C 3/00 |
| | | | | 169/61 |
| 2016/0271434 A1* | 9/2016 | Dusing | | H04L 67/12 |
| 2016/0321900 A1* | 11/2016 | Rao | | B05B 12/12 |
| 2016/0354626 A1* | 12/2016 | McNamara | | A62C 35/023 |
| 2017/0259097 A1* | 9/2017 | Orglmeister | | A62C 31/28 |
| 2018/0161793 A1* | 6/2018 | Disimile | | B64F 5/23 |
| 2019/0175964 A1* | 6/2019 | Beecham | | A62C 2/06 |
| 2020/0408204 A1 | 12/2020 | Flaster | | |
| 2022/0008773 A1* | 1/2022 | Conboy | | A62C 3/02 |
| 2022/0016455 A1* | 1/2022 | Tohidi | | G06F 16/9038 |
| 2022/0054876 A1* | 2/2022 | Conboy | | A62C 3/02 |
| 2023/0233890 A1* | 7/2023 | Chandler | | A62C 35/02 |
| | | | | 340/525 |

* cited by examiner

AI-DRIVEN OFF-GRID FIRE PREVENTION SYSTEM AND METHOD

CROSS-REFERENCE TO RELATED APPLICATIONS

Priority is claimed in the application data sheet to the following patent applications, each of which is incorporated herein by reference in its entirety:
Ser. No. 17/585,662

BACKGROUND

Field of the Art

The disclosure relates to the field of fire prevention systems, and more particularly to the field of automated fire prevention systems.

Discussion of the State of the Art

In the field of fire prevention systems, rooftop systems are the most widely known and successfully employed home fire protection method. These systems mainly consist of a large standing water supply, a backup power source such as a gasoline powered regenerator or solar panels with batteries, and a central processing computer which controls a series of valves and sprinklers connected to a main pump, as exampled in patent applications such as Conboy US 2019/0171999 A1, Lalouz US 2010/0071917 A1, Menard US 2016/0051850 A1, Smith et al. US 2017/0157441 A1, Statter US 2019/0262637 A1, and Weber US 2018/0339180 A1.

These systems must discharge a high density of water over the entirety of a home prior to, during, and after impinging firebrands which requires storage of massive amounts of water. Even though rooftop systems are the most respected both by individual homeowners, insurers, and firefighters, widespread adoption has been slow. This is in part because each system must be designed to the perfect square dimensions of every home which makes manufacturing lengthy. Installation times average 5-7 days because they require large water containers, generators, piping, and sprinklers to be irrigated around the house. Moreover, the lack of professional installers and the considerable time and energy required to design each personalized system makes availability and scalability extremely low, not to mention the massive amount of water needed to adequately cover the property.

Mobile systems, such as Beecham US 2019/0175964 A1 and Howard, Sr. U.S. Pat. No. 9,764,174 B2 provide a less-permanent installation but still require large amounts of some aqueous-solution to saturate and protect an area. However, even with large storage tanks of water, in the case of rooftop or mobile systems, it is likely that the water supply will be exhausted before complete extinguishment of the burning house over the duration of the fire event.

While the systems discussed above may provide good coverage, be self-contained, and may be remotely or automatically activated, they ultimately fail because of their installation complexity, indiscriminate spraying, or voluminous and wasteful discharge.

What is needed is a system and method that provides a fully autonomous and robotic system that operates 24/7, with capabilities to detect, aim, and suppress a fire rapidly with minimal resources.

SUMMARY

Accordingly, the inventor has conceived and reduced to practice, a system and method for protecting an area from fire having one or more area fire prevention units capable of discharging fire suppressant via a directable nozzle, each fire prevention unit being communicatively coupled to a computing device which detects airborne firebrands, predicts their trajectories and final landing positions, and directs one or of the fire prevention units to discharge fire suppressant toward the firebrand at its final landing position. Depending on configuration, the system may further use wind data, GPS, and terrain models to calculate the trajectory and final position of the firebrand. Also depending on configuration, the system may calculate a spread and distance of suppressant discharge, a nozzle aperture, and an amount of suppressant to discharge. Some embodiments may use trained machine learning algorithms to make one or more of the system's calculations.

According to a preferred embodiment, a system for protecting an area from fire is disclosed, comprising: one or more area fire prevention units, each area fire prevention unit comprising a nozzle, a turret, a control box, and a suppression subsystem comprising at least one tank of fluid; a first sensor communicatively coupled to a computing device, the first sensor being configured to detect a firebrand and relay firebrand positional data to the computing device; the computing device communicatively coupled to the first sensor and the one or more area fire prevention units, wherein the computing device is configured to: detect a firebrand within the area using the first sensor determine a trajectory of the firebrand from the firebrand positional data; determine a final position of the firebrand from the trajectory; send a signal to a turret of a first area fire prevention unit of the one or more fire prevention units, the signal causing the turret to position a nozzle of the first fire prevention unit toward the final position of the firebrand; calculate a spread and distance of fluid discharge needed to extinguish the firebrand at the final position from the first fire prevention unit; calculate a nozzle aperture for the nozzle required to discharge fluid at the calculated spread and distance; send a signal to the nozzle, wherein the signal actively configures the nozzle to an appropriate aperture size, according to the calculated spread and distance and the final position; calculate an amount of fluid needed to extinguish the firebrand based on the calculated spread and distance and the final position; and discharge the amount of fluid from the suppression subsystem to extinguish the firebrand at the final position.

According to another preferred embodiment, a method for protecting an area from fire, comprising the steps of: installing one or more area fire prevention units in the area to be protected, each area fire prevention unit comprising a nozzle, a turret, a control box, and a suppression subsystem comprising at least one tank of fluid; communicatively coupling a first sensor to a computing device, the first sensor being configured to detect a firebrand and relay firebrand positional data to the computing device; using the computing device communicatively coupled to the first sensor and the one or more area fire prevention units to: detect a firebrand within the area using the first sensor; determine a trajectory of the firebrand from the firebrand positional data; determine a final position of the firebrand from the trajectory; send a signal to a turret of a first area fire prevention unit of the one or more fire prevention units, the signal causing the turret to position a nozzle of the first fire prevention unit toward the final position of the firebrand; calculate a spread and distance of fluid discharge needed to extinguish the firebrand at the final position from the first fire prevention unit; calculate a nozzle aperture for the nozzle required to discharge fluid at the calculated spread and distance; send a signal to the nozzle, wherein the signal actively configures the nozzle to an appropriate aperture size, according to the calculated spread and distance and the final position; calculate an amount of fluid needed to extinguish the firebrand based on the calculated spread and distance and the final position; and discharge the amount of fluid from the suppression subsystem to extinguish the firebrand at the final position.

According to an aspect of an embodiment, an ember classifier comprising a machine learning algorithm is trained to identify embers from data of the type acquired by the first sensor.

According to an aspect of an embodiment, the trajectory and final position are calculated in part using a classification of the firebrand from the ember classifier.

According to an aspect of an embodiment, the amount of fluid is based in part using a classification of the firebrand from the ember classifier.

According to an aspect of an embodiment, a second sensor is communicatively coupled with the computing device, the second sensor being an anemometer which provides real-time wind data to the computing device, wherein the trajectory and final position of the firebrand are calculated in part using the real-time wind data from the second sensor.

According to an aspect of an embodiment, a model of surrounding terrain is stored on the computing device, wherein the trajectory and final position of the firebrand are calculated in part from the model of the surrounding terrain.

According to an aspect of an embodiment, an ember classifier comprising a machine learning algorithm is trained to classify embers from data of the type acquired by the first sensor; a second sensor is communicatively coupled with the computing device, the second sensor being an anemometer which provides real-time wind data to the computing device; a model of surrounding terrain is stored on the computing device; and a machine learning algorithm is trained to calculate trajectories and final positions of firebrands from a combination of firebrand positional data, ember classifications, real-time wind data, and models of surrounding terrain, wherein the calculation of the trajectory and final position of the firebrand are calculated by the machine learning algorithm using: the firebrand positional data from the first sensor; a classification of the ember from the ember classifier; the real-time wind data from the anemometer; and the model of surrounding terrain.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
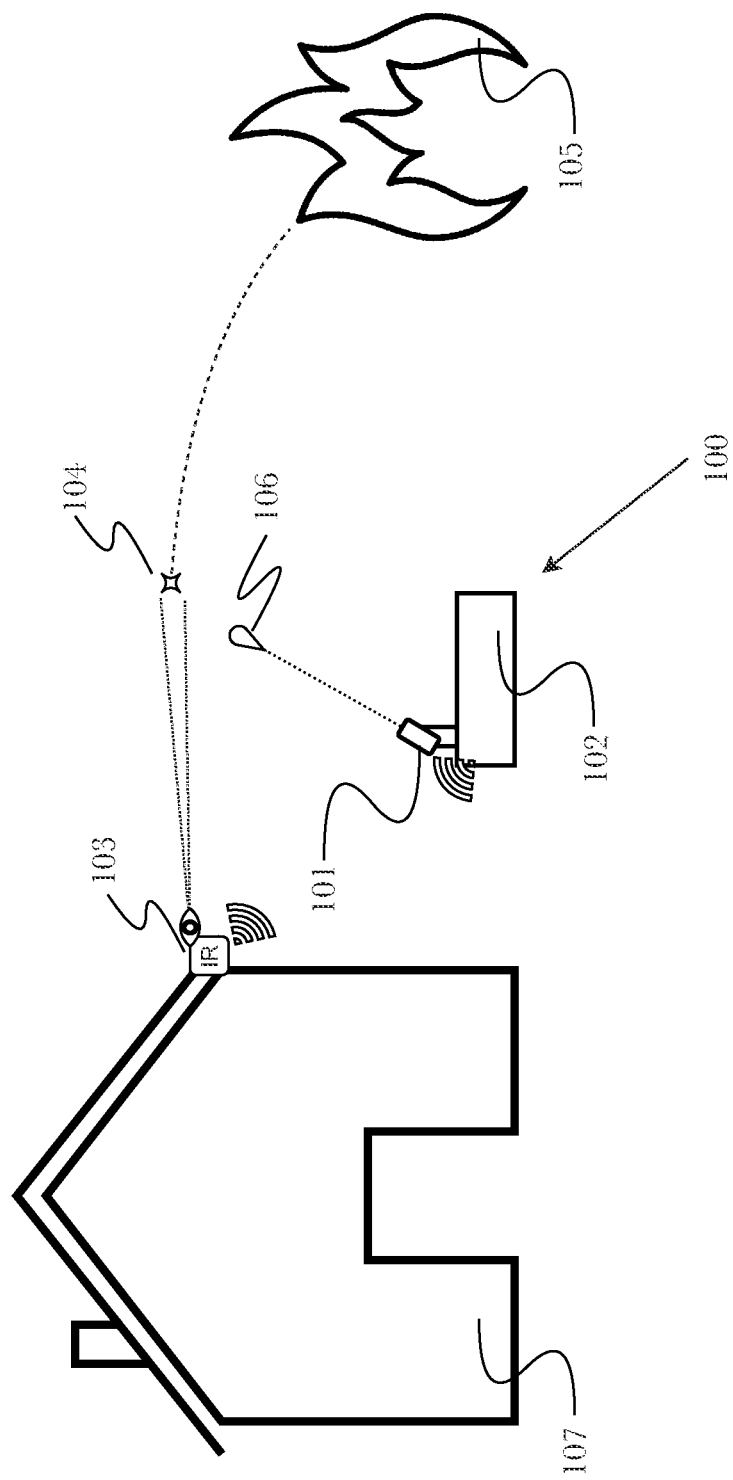
FIG. 1 is a block diagram illustrating an exemplary system for an AI-driven off-grid fire prevention system, according to one aspect.

The inventor has conceived, and reduced to practice, a system and method for protecting an area from fire having one or more area fire prevention units capable of discharging fire suppressant via a directable nozzle, each fire prevention unit being communicatively coupled to a computing device which detects airborne firebrands, predicts their trajectories and final landing positions, and directs one or of the fire prevention units to discharge fire suppressant toward the firebrand at its final landing position. Depending on configuration, the system may further use wind data, GPS, and terrain models to calculate the trajectory and final position of the firebrand. Also depending on configuration, the system may calculate a spread and distance of suppressant discharge, a nozzle aperture, and an amount of suppressant to discharge. Some embodiments may use trained machine learning algorithms to make one or more of the system's calculations The system is designed to be machine-learning enabled, reliable, scalable, versatile, and may be efficiently installed, and may employ artificial intelligence to make its calculations. The system will improve US, state, and local fire suppression efforts because more homeowners will successfully evacuate if they have access to protection. Also, it may allow more fire crews to focus their efforts on the flame front, rather than suppressing structural spot fires in areas where the systems are installed. The system may reduce insurance and governmental suppression costs which would provide significant incentives to homeowners. The system minimizes fire related damage to the home, may operate independently from local utilities, may remain in service with minimal attention from the homeowner, and minimize the impact of system discharge on the environment. The system does this by precisely targeting firebrands and discharging only the amount of aqueous solution needed to extinguish the fire band.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system for an AI-driven off-grid fire prevention system. Fire prevention system may refer to a fire prevention unit 100 or the combination of a fire prevention unit 100 and optional sensors 103. The fire prevention unit 100 comprises a smart monitor and nozzle 101 attached to a unit housing assembly 102 and a suppression system and computing device contained within the unit housing assembly 102. According to one embodiment, the optional sensors 103 are one or more communicatively coupled sensors 103 that may be used to supplement the system 100 by increasing the detectability of embers from more advantageous locations. In a general sense, the system works as follows: a fire prevention system monitors for firebrands (i.e., embers) 104 from a distant or approaching fire 105 via sensors onboard the unit 100, or sensors 103 located around the premises 107, or a combination thereof. Upon detection, the ember's 104 trajectory is calculated by an onboard, cloud-based, or hybrid machine learning computing system which aims the nozzle 101 and discharges suppressant 106 at a density sufficient to eliminate target firebrand accumulations. The trajectory is calculated using positional data from at least one sensor (e.g., infrared, camera with computer vision, heat sensor, video data, etc.) but may be supplemented with data from anemometers, depth or ranger sensors, GPS data, sensors mounted on drones, etc.

Figure 2:
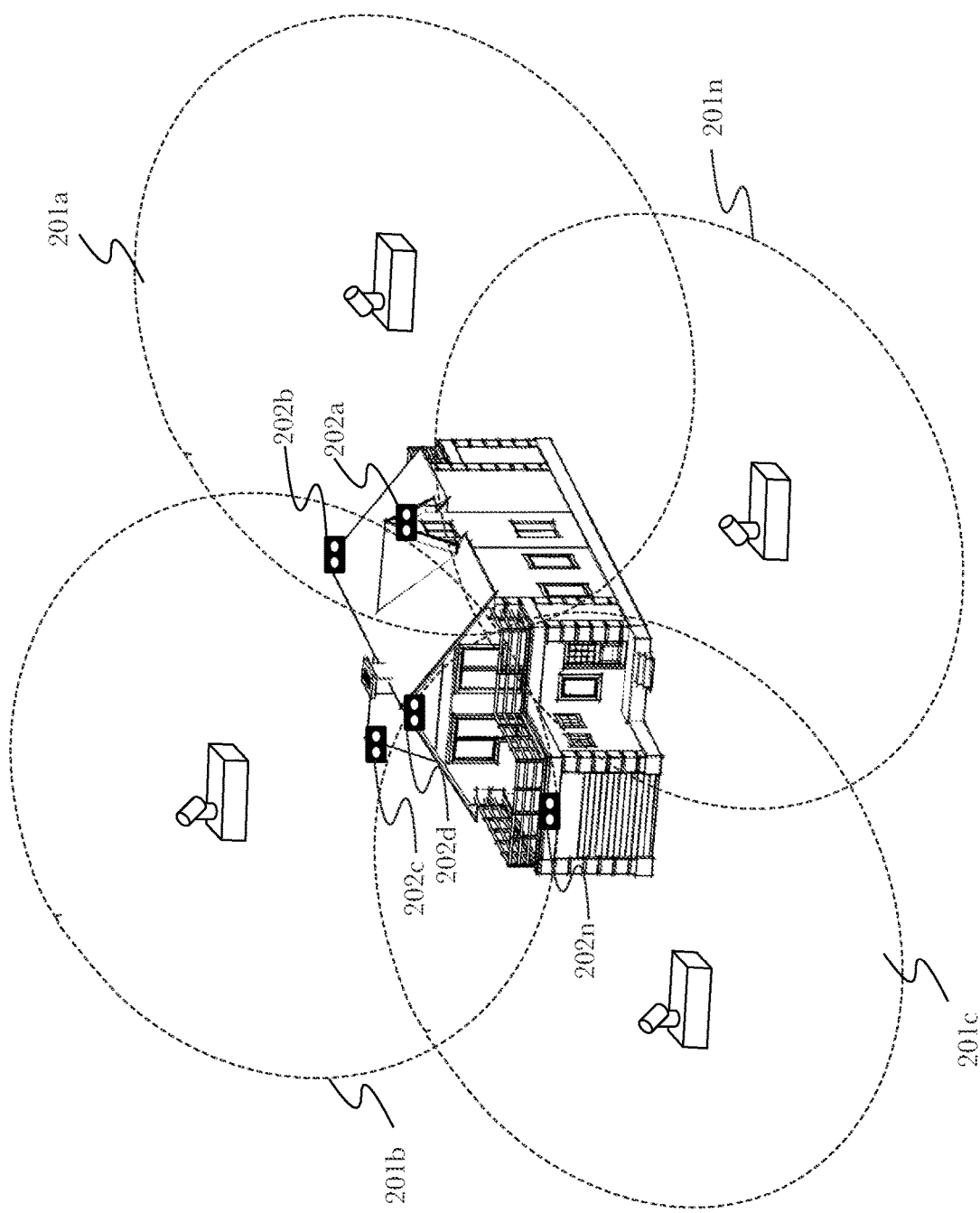
FIG. 2 is a diagram illustrating an exemplary deployment of an AI-driven off-grid fire prevention system, according to one aspect.

FIG. 2 is a diagram illustrating an exemplary deployment of an AI-driven off-grid fire prevention system. According to one embodiment, fire prevention units are strategically placed around a property, such that the range of each fire prevention unit 201*a-n*, provides complete coverage of the property. Likewise, sensors 202a-n may be strategically placed around the property to enhance the detectability of embers. In the event of an approaching wildfire, sensors 202a-n will identify firebrand targets on or around the structure that is put it at risk of being damaged or destroyed. The sensors 202a-n will wirelessly communicate the location of the targets to the fire prevention unit within the respective suppression zone 201a-n. Once the size and location, or trajectory of the target has been delivered to the system, the fire prevention unit will use its equipped smart monitor to aim and suppress the target until the threat has been eliminated.

According to one embodiment, bespoke installation is used for each application of the sensors 202a-n and units 100. Specifically, satellite imagery, past wildfire events, and machine learning may be used to determine the amount and optimal placement of units 100 and sensors 202a-n. As an example, machine learning or manual analysis of past wildfire events, terrain topology, and other considerations may determine that a property to be protected only requires units and sensors on the East side of the property 201b/201c/202c, as fire is highly unlikely to approach from other directions due to other considerations, e.g., mountains, other protected properties, bodies of water, etc. This example would modify the illustration of FIG. 2 to only employ two units 100 within the of range 201b and 201c and sensors 202c, thus decreasing the cost and economic burden of protecting the entire property as well as enhancing the evaluation of insurance premiums.

Figure 3:
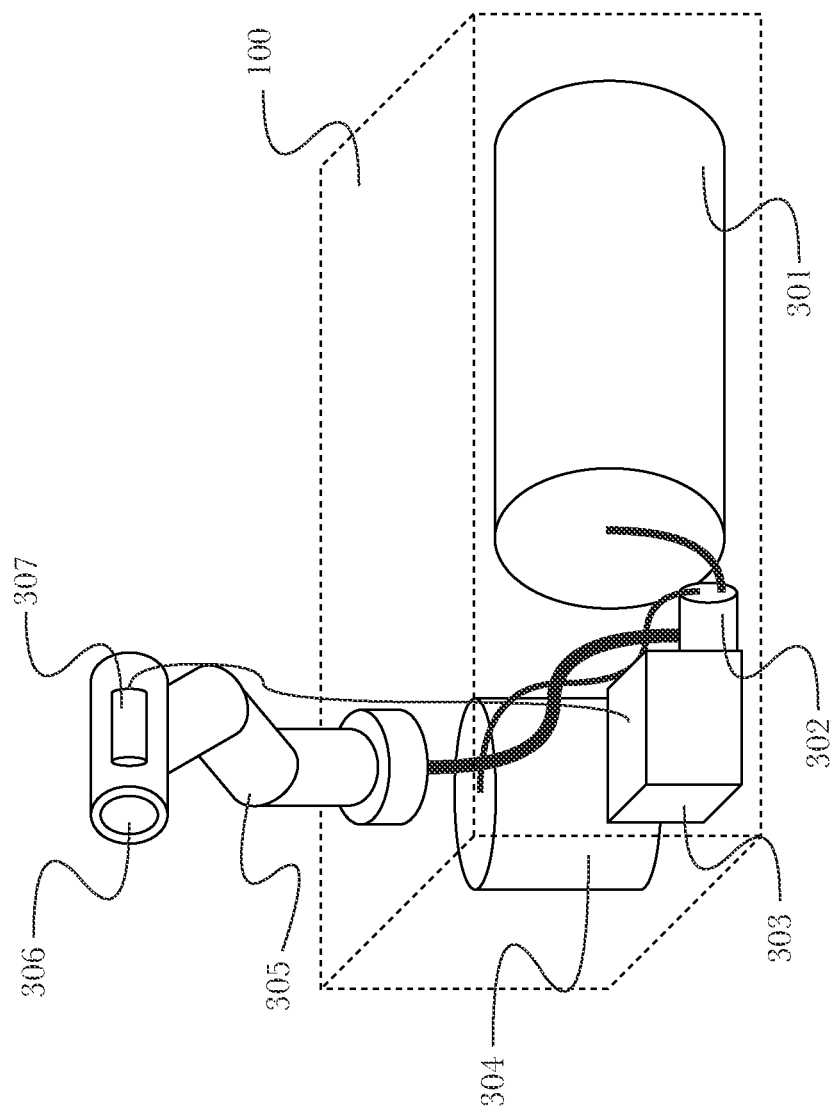
FIG. 3 is a perspective-illustration of an exemplary configuration for an AI-driven off-grid fire prevention unit, according to one aspect.
Figure 4:
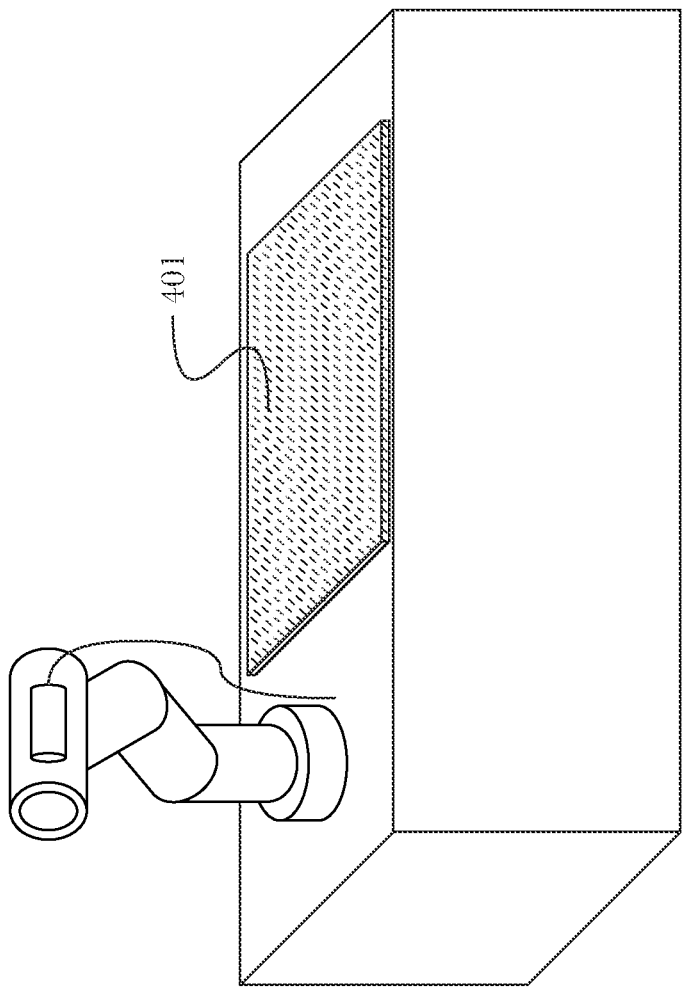
FIG. 4 is a perspective-illustration of an optional aspect of an AI-driven off-grid fire prevention unit, according to one aspect.
Figure 5:
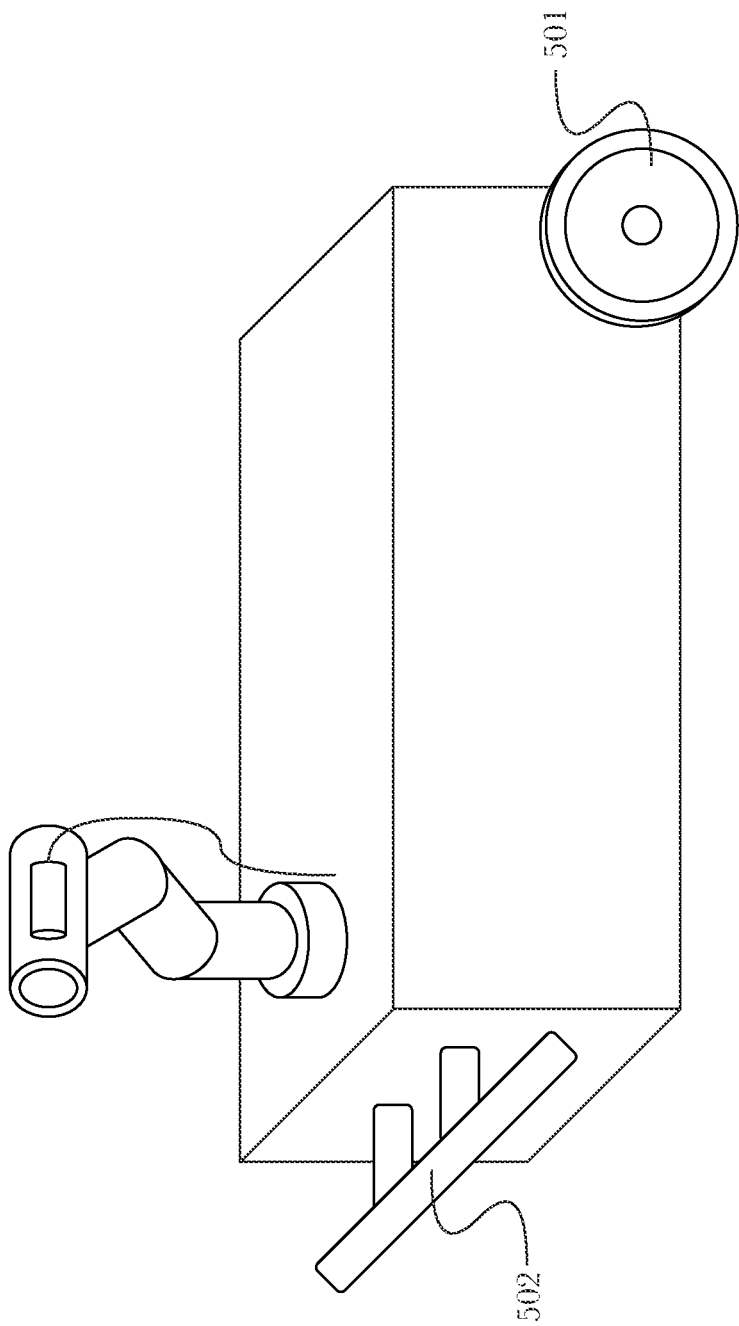
FIG. 5 is a perspective-illustration of another optional aspect of an AI-driven off-grid fire prevention unit, according to one aspect.

FIG. 3 is a perspective-illustration of an exemplary configuration for an AI-driven off-grid fire prevention unit, according to one aspect. Fire prevention unit comprises a storage tank for water 301, one or more pumps and a means for mixing an aqueous solution 302, a control box with electronics and one or more batteries 303, a storage tank for fire suppressant 304, a turret with multiple points of inflection resulting in near 360° coverage 305, and a nozzle with stream shaper end 306 that is computer-actuated 307 and attached to the turret 305. This illustration, and the following illustrations FIG. 3-FIG. 5 are idealized and may not show all parts or other optimal configurations of the internal parts 301-307.

Figure 9:
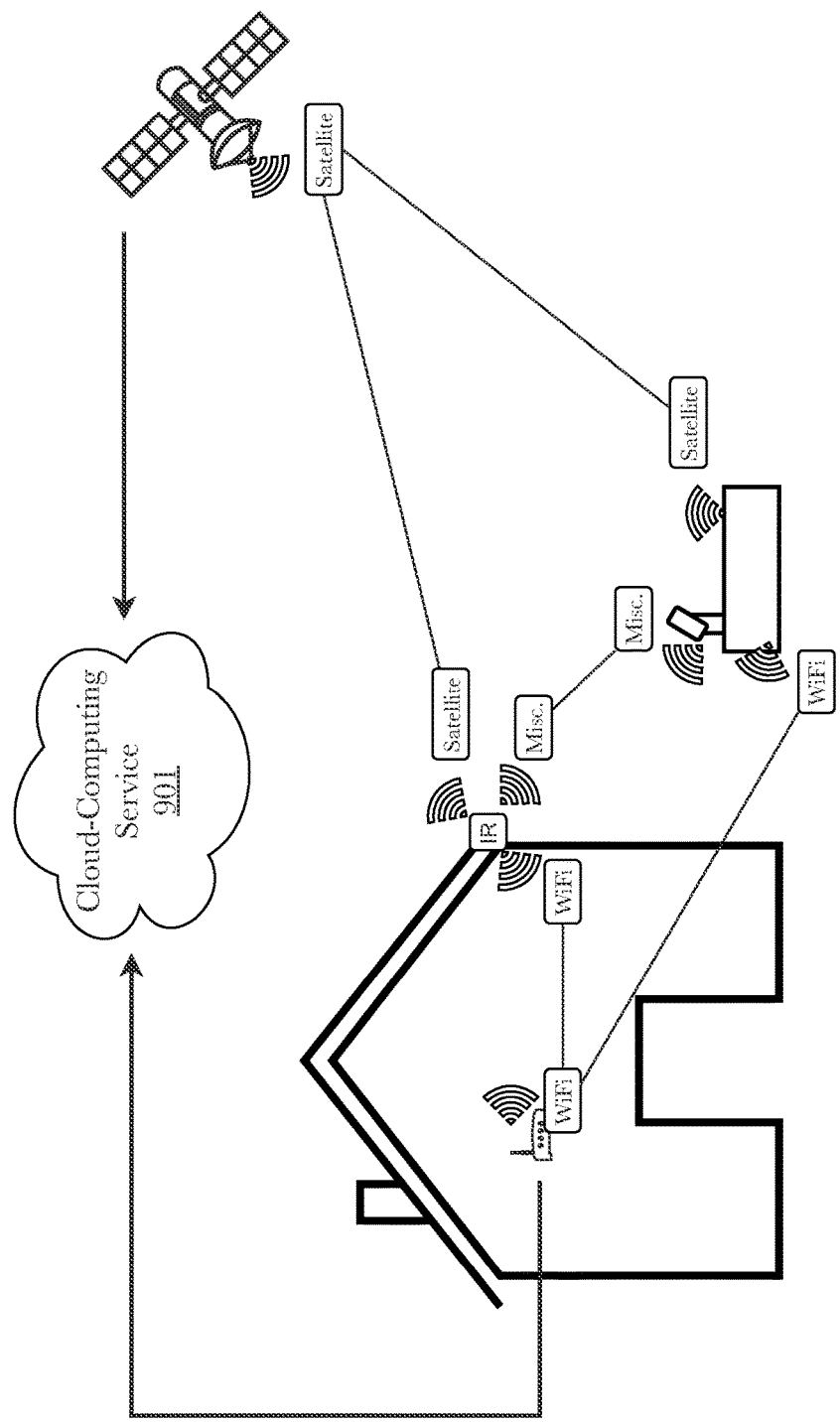
FIG. 9 is a block diagram illustrating computing and communication protocol variants for use in an AI-driven off-grid fire prevention system, according to one aspect.

The electronics 303 may comprise a computing device capable of stand-alone, cloud, or hybrid based machine learning algorithms which self-learn the capable suppression range and obstacles in a particular environment. Multiple fire prevention units 100 and sensors 103 may be communicatively linked together in a mesh-type (or other type) network in order to communicate collectively to determine the optimal suppression ranges with respect to overlapping ranges as in FIG. 2. Fire prevention units 100 and sensors 103 may be connected to a cloud-based service 901—See FIG. 9—by one or more communication protocols for receiving and sending reports, receiving updated firmware, and processing, receiving, or sharing machine learning models. Communication between fire prevention units 100, sensors 103, properties (Such as home-owner computing systems and routers), and cloud-based services may employ one or more communication protocols such as, but not limited to: Wi-fi, Bluetooth, Zigbee, Z-Wave, 6LoWPAN, RFID, GSM, GPRS, EDGE(2G), UMTS, HSPA(3G), LTE (4G), 5G, NFC, LoRaWAN, LTE-M. Machine learning used for fire prevention units 100 may comprise models for learning problems such as supervised learning, unsupervised learning, and reinforcement learning; hybrid learning problems such as semi-supervised learning, self-supervised learning, multi-instance learning; statistical inference models such as inductive learning, deductive inference, and transductive learning; and learning techniques such as multi-task learning, active learning, online learning, transfer learning, and ensemble learning—see FIG. 10 and FIG. 11 for machine learning details.

The turret 305 and nozzle 306 are controlled electronically by the control box 303 and actuators 307. The turret 305 may have multiple articulable points along the shaft that allow the shaft to rotate in various planes and angles such that the nozzle may point directly skywards to within a 1-foot radius around the fire prevention unit below and every angle in-between. The nozzle 306 comprises a stream spreader adjustment that allows the control box 303 to electronically change the spread and size of fluid discharge.

The holding tanks and other mechanics (pumps, actuators, level sensors, etc.) make up the suppression subsystem. Some embodiments may only employ one tank in the suppression subsystem while others may use more than one. Various embodiments may allow for tanks to be filled from a fill port on the outside of the fire prevention unit. Other embodiments may allow for tanks to be exchanged at a facility. According to one embodiment, $CO_2$ is used to propel liquid within the subsystem rather than pumps. In yet another embodiment, a combination of pumps and $CO_2$ is used to move, mix, propel, or shoot liquid within and from the subsystem. The characteristics of $CO_2$ provide stability and longevity for off- or on-grid operations.

FIG. 4 is a perspective-illustration of an optional aspect of an AI-driven off-grid fire prevention unit, according to one aspect. Fire prevention units may operate independent from power utilities via onboard fuel generators (not shown), solar arrays 401, battery packs, and combinations thereof. Internal computing devices may be configured to wake the system and perform periodic testing of the system as well as optionally sending reports of such tests. Fire prevention units may be plugged in to utilities to trickle-charge batteries or perform firmware updates. Fire prevention units may optionally be permanently wired if desired and automatically switch to alternate power if utilities fail.

Additionally, fire prevention units may be outfitted with a plurality of sensors (Not shown—however, may be integrated as needed internal or external of the fire prevention unit. Sensors may be but are not limited to: vision and imaging sensors, temperature sensors, radiation sensors, proximity sensors, pressure sensors, position sensors, photoelectric sensors, particle sensors, motion sensors, metal sensors, level sensors, leak sensors, humidity sensors, gas and chemical sensors, force sensors, flow sensors, flaw sensors, flame sensors, electrical sensors, contact sensors, and non-contact sensors. Sensor data, performance data, and computational data may be streamed wirelessly to a cloud-based service or a local server during operation in a fire response event. These same sensors may also be incorporated into the external sensors.

Fire prevention units may be equipped with wheels 501 and handles 502—See FIG. 5—and may be stored and brought out in the occurrence of an approaching fire. Stored fire prevention units may report tank levels periodically, perform self-checks, and update firmware given power and utilizing at least one communication protocol established above. Fire prevention units may be stored with empty tanks, the tanks to be filled when the need arises.

Fire prevention units may be mounted to utility poles or transmission towers to automatically detect and extinguish fires. Fire prevention units mounted to poles or towers may store class A, B, C extinguishing agent, or a combination thereof. For example, a fire prevention unit mounted on a wood utility pole may store a combination of class A—for wood—and class C—for electrical—extinguishing agent, so in the event of a fire, the fire prevention unit may use the appropriate class of agent per the type of fire detected through the sensors or machine learning algorithm.

Figure 6:
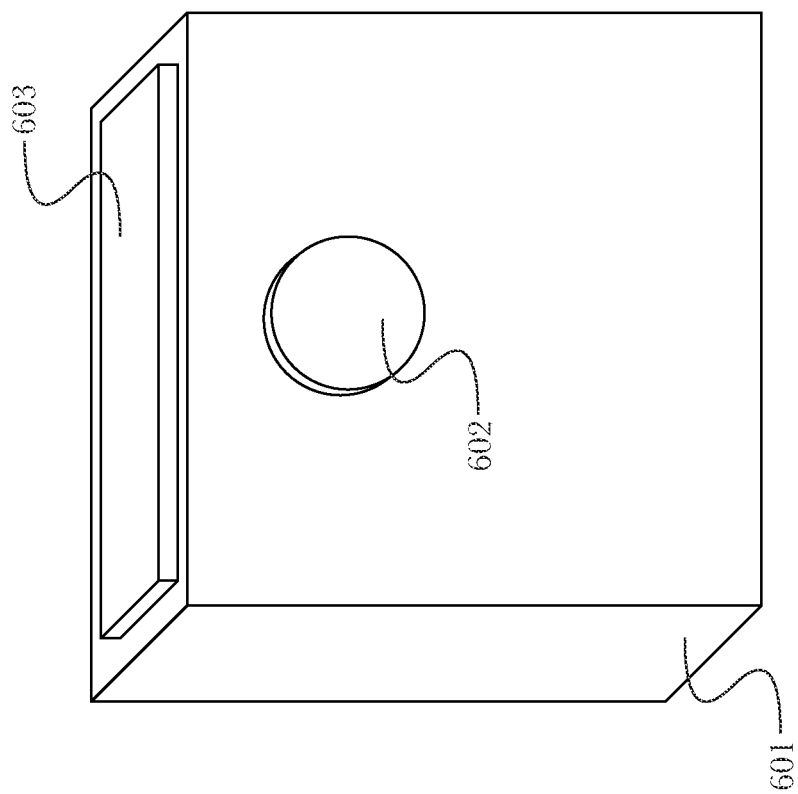
FIG. 6 is a front-facing perspective illustration of an exemplary configuration for an optional sensor unit to supplement an AI-driven off-grid fire prevention system, according to one aspect.
Figure 7:
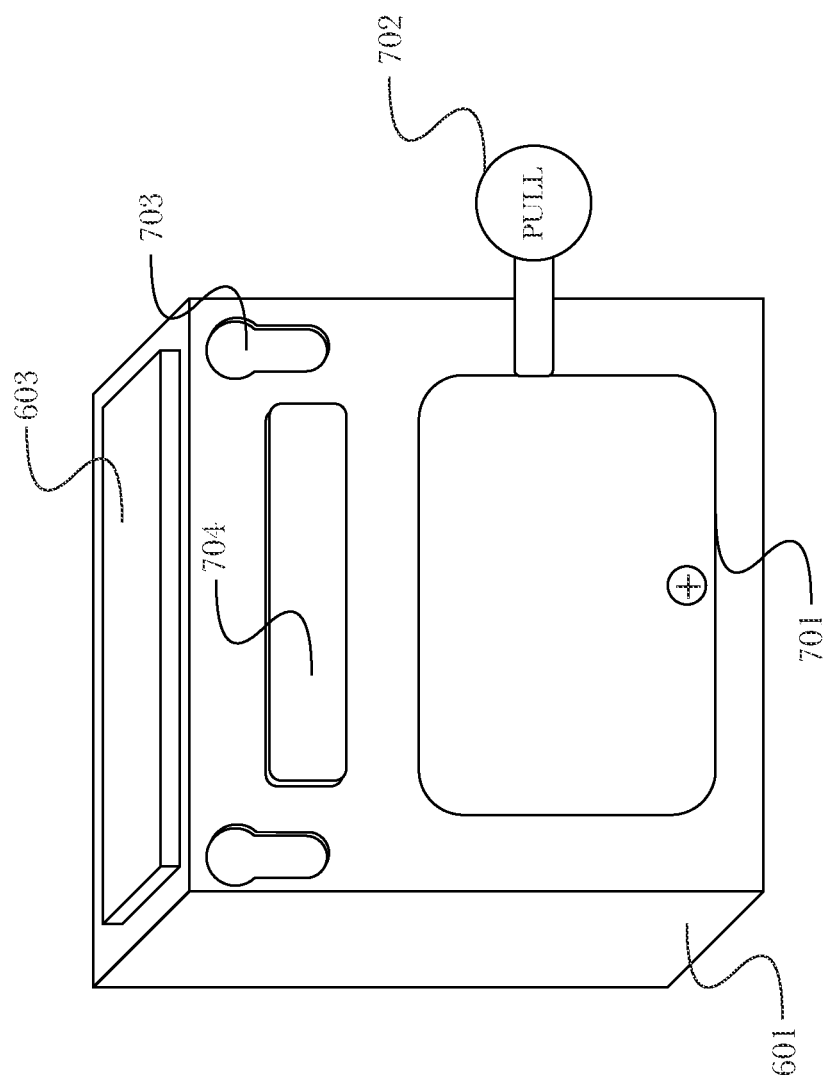
FIG. 7 is a rear-facing perspective-illustration of an exemplary configuration for an optional sensor unit to supplement an AI-driven off-grid fire prevention system, according to one aspect.
Figure 8:
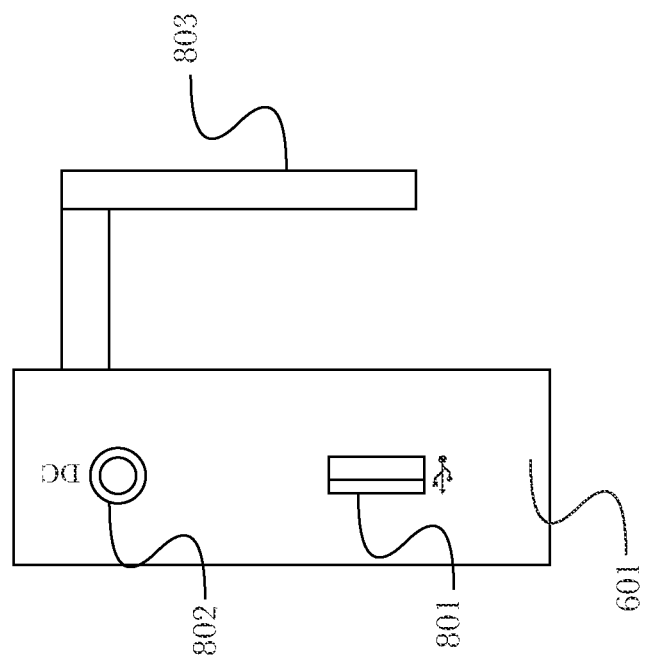
FIG. 8 is a side-facing perspective-illustration of an exemplary configuration for an optional sensor unit to supplement an AI-driven off-grid fire prevention system, according to one aspect.

FIG. 6 is a front-facing perspective illustration of an exemplary configuration for an optional sensor unit to supplement an AI-driven off-grid fire prevention system, according to one aspect. External sensors 601 may be used solely to communicate targets or in combination with sensors integrated in fire prevention units. Sensor units comprise a sensor for detecting firebrands 602, a power source (e.g., solar 603, batteries, etc.), and a computing device capable of communicating firebrand acquisition data to a fire prevention unit. Communication between sensors and other devices/service may employ one or more communication protocols such as, but not limited to: Wi-fi, Bluetooth, Zigbee, Z-Wave, 6LoWPAN, RFID, GSM, GPRS, EDGE (2G), UMTS, HSPA(3G), LTE(4G), 5G, NFC, LoRaWAN, LTE-M. Sensors may be but are not limited to: vision and imaging sensors (e.g., IR), temperature sensors, radiation sensors, proximity sensors, pressure sensors, position sensors, photoelectric sensors, particle sensors, motion sensors, metal sensors, level sensors, leak sensors, humidity sensors, gas and chemical sensors, force sensors, flow sensors, flaw sensors, flame sensors, electrical sensors, contact sensors, and non-contact sensors. This illustration, and the following illustrations FIG. 6-FIG. 8 are idealized and may not show all parts or other optimal configurations of the external and internal parts.

The back of a sensor unit (referring to FIG. 7) may comprise a battery compartment that holds rechargeable or non-rechargeable batteries 701 and further comprises a reusable pull tab 702 that may be used to provide a power-disconnect for the sensor unit while in storage but allow for quick activation (pulling the tab completes the circuit) in the case of rapid deployment. Unit sensors may be permanently installed or deployed when needed. They may be attached to an object using mounting holes 703, magnets 704, or clips 803 (As in FIG. 8). Units may also be powered from or having the batteries charged from a USB port 801, a DC port 802, or other types of ports as known in the art. USB ports 801 (and other types of data transmission standards) may double as data ports to troubleshoot, update, and perform other computing operations on the sensor unit 601.

Figure 10:
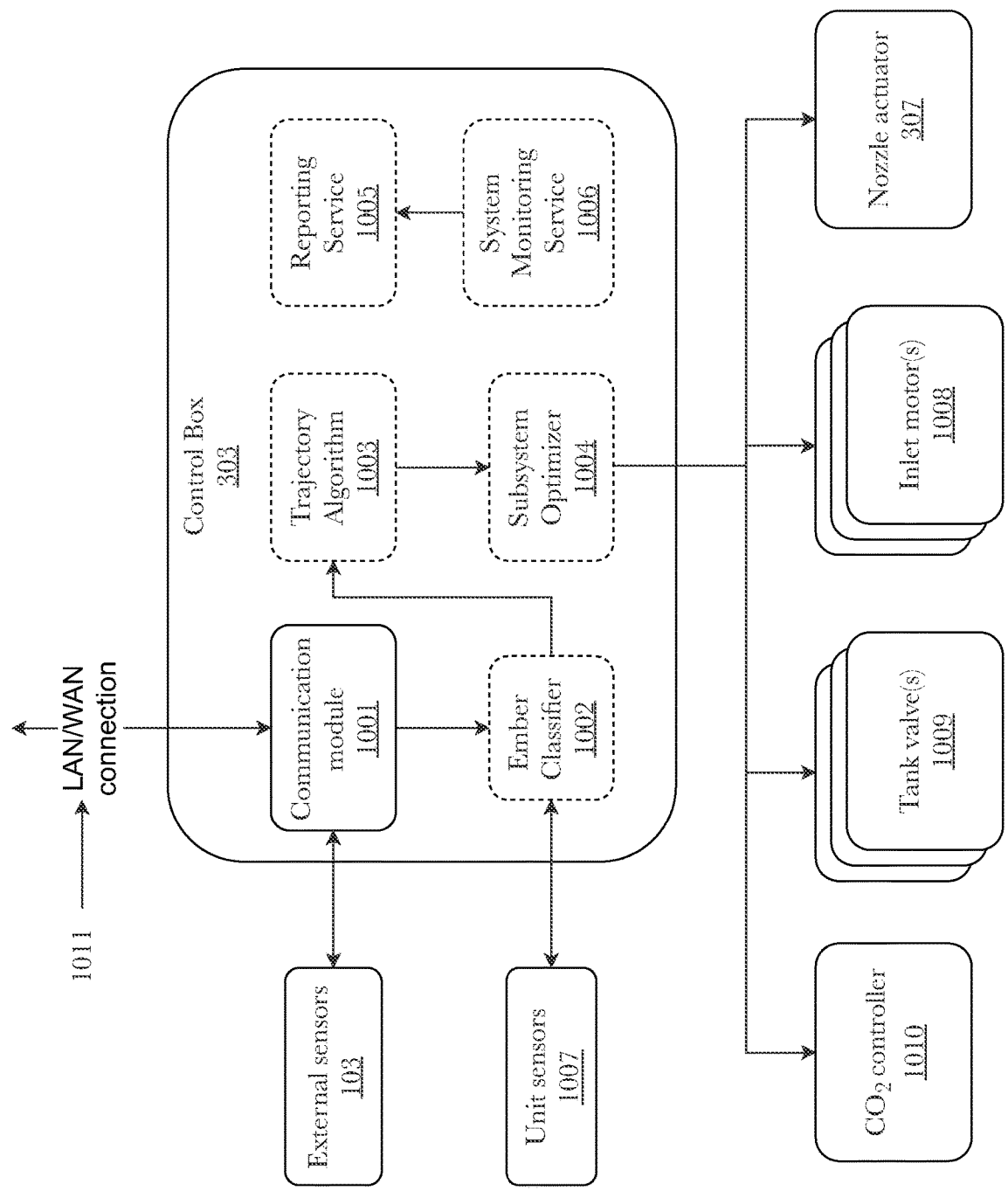
FIG. 10 is a block diagram illustrating an exemplary machine-learning-enabled computer configuration for use in an AI-driven off-grid fire prevention system, according to one aspect.

FIG. 10 is a block diagram illustrating an exemplary machine-learning-enabled computer configuration for use in an AI-driven off-grid fire prevention system, according to one aspect. A control box 303, i.e., a specialized computing device, comprises at least a processor (not shown), memory (not shown), and a communication module 1001. Operating on the processor(s) are an ember classifier 1002, trajectory algorithm 1003, subsystem optimizer 1004, reporting service 1005, and system monitoring service 1006. A control box 303 receives data from both unit 1007 and external sensors 103. A control box 303 controls a nozzle actuator 307, one or more inlet motors 1008, one or more tank valves or fluid valves 1009, and a $CO_2$ controller.

According to various embodiments, data collection and processing may be configured in various ways: a) external sensors 103 send data to the fire prevention unit; the fire prevention unit combines external sensor 103 data with unit sensor 1007 data and processes the combined data locally, or in a cloud-based infrastructure, or in a hybrid environment, b) external sensors 103 process data locally and send alerts and positional data to the fire prevention unit; the fire prevention unit processes the combined sensor data 103/1007 locally, or in a cloud-based infrastructure, or in a hybrid environment, or c) external sensors 103 and unit sensor 1007 data each directly send data to cloud-based infrastructure for processing and the cloud-based infrastructure sends commands to the fire prevention unit.

As described in previous figures, external sensors 103 may be directly or wirelessly connected to the fire prevention unit (via a communications module 1001) using a plurality of communication protocols. A communications module 1001 may be used to make a LAN/WAN connection to other fire prevention units on the same property and/or worldwide creating a large-scale machine learning model; continuously updating the various machine learning algorithms 1002-1004. A communications module 1001 may be used to make a LAN/WAN connection to other fire prevention units on the same property to communicate and automatically determine coverage zones for each unit using GPS data and known performance/operating metrics. Because the fire prevention unit can be powered normally (i.e., using grid power) machine learning can continuously take place even if not in an active ember engagement, and even though it functions in a fire while off the grid. Machine learning can take place locally, in a cloud-environment, or a combination thereof (i.e., hybrid).

Fire prevention units comprise a plurality of mechanical components. According to one embodiment, a fire prevention unit comprises a $CO_2$ controller 1010 that regulates the timing and amount of $CO_2$ used to propel the fluid discharge. Tank valves 1009 are electronically actuated to control the release of fluids contained in storage tanks. Inlet motors 1008 are used to position the nozzle in the direction of the targeted ember. Inlet motors 1008 may be stepper motors controlled by square wave signals from the control box 303, or other types of motors known in the art. A nozzle actuator 307 is an electronically controlled nozzle that can fully open, partially open, or completely close the aperture from which the fluid departs the system. Doing so allows the spread and distance of the discharged fluid to be manipulated for accuracy and precision targeting as well as fluid conservation.

A system monitoring service 1006 may monitor various aspects of the fire prevention unit. Some aspects are, but not limited to: connection to and status of external/unit/mechanical sensors, connection to the LAN/WAN, operating parameters, machine learning outputs, and performance rates (e.g., extinguish rates, etc.). Sensors are not limited to sensors for detecting embers, but may also include fluid level sensors, pressure sensors, gas sensors, temperature sensors, etc. The system monitoring service 1006 may be configured to monitor/poll sensors at varying rates and depending on factors such as whether the fire prevention unit is operating on battery, solar, utility power or whether the fire prevention unit is in standby mode or an active fire fighting mode. For example, the system monitoring service 1006 may perform monthly checks when operating on solar power and in standby mode. The system monitoring service 1006 outputs data to a reporting service 1005 which generates, stores, and/or sends reports of the varying aspects of the monitoring service 1006 as well as other aspects of the fire prevention unit such as processing data (machine learning parameters and metrics), ember detections, successful and failed attempts to extinguish embers and the like.

According to one embodiment, at least some of the machine learning and processing that takes place during an active fire prevention event is spread between an ember classifier 1002, a trajectory algorithm 1003, and a subsystem optimizer 1004. An ember classifier 1002 is a type of machine learning model (but is not limited to one type of model, for example a generative adversarial network may be used) that is trained on data to identify embers given the appropriate sensor type. For example, a classifier may be trained on data coming from radar sensors, IR sensors, camera feeds, UV sensors, or various bespoke light sensors used for detecting ember heat signatures and other ember characteristics. Training data can be computer-generated or trained from controlled fires. Once trained, the machine learning model can be deployed to sensors and fire prevention units depending on the desired configuration.

A trajectory algorithm 1003 takes in data associated with an identified ember and determines its trajectory and final position. According to one embodiment, an ember's trajectory may be calculated using one or more of the following data sets: a) real-time wind readings from anemometers on one or more fire prevention units and one or more sensors, b) GPS positional data from one or more sensors and fire prevention units allowing triangulation of an ember's position, c) range data from sensors such as ultrasonic and laser sensors which may be able to track in real time the location of an ember, d) cameras feeding computer vision algorithms, or e) models of the surrounding terrain and using known distance markings to determine trajectory. The previous data sets may be ingested into a real-time modeling service (not shown) which may be used to map this data in a 3D map or in the latent space of a machine learning model.

A subsystem optimizer 1004 uses the trajectory algorithm 1003 output to position the nozzle by rotating the various inlet motors 1008 and adjusting the nozzle actuator 307 to the appropriate gauge before operating the $CO_2$ controller 1010 and various tank valves 1009 to discharge the appropriate amount at the proper time to accurately and precisely extinguish the targeted ember.

Figure 11:
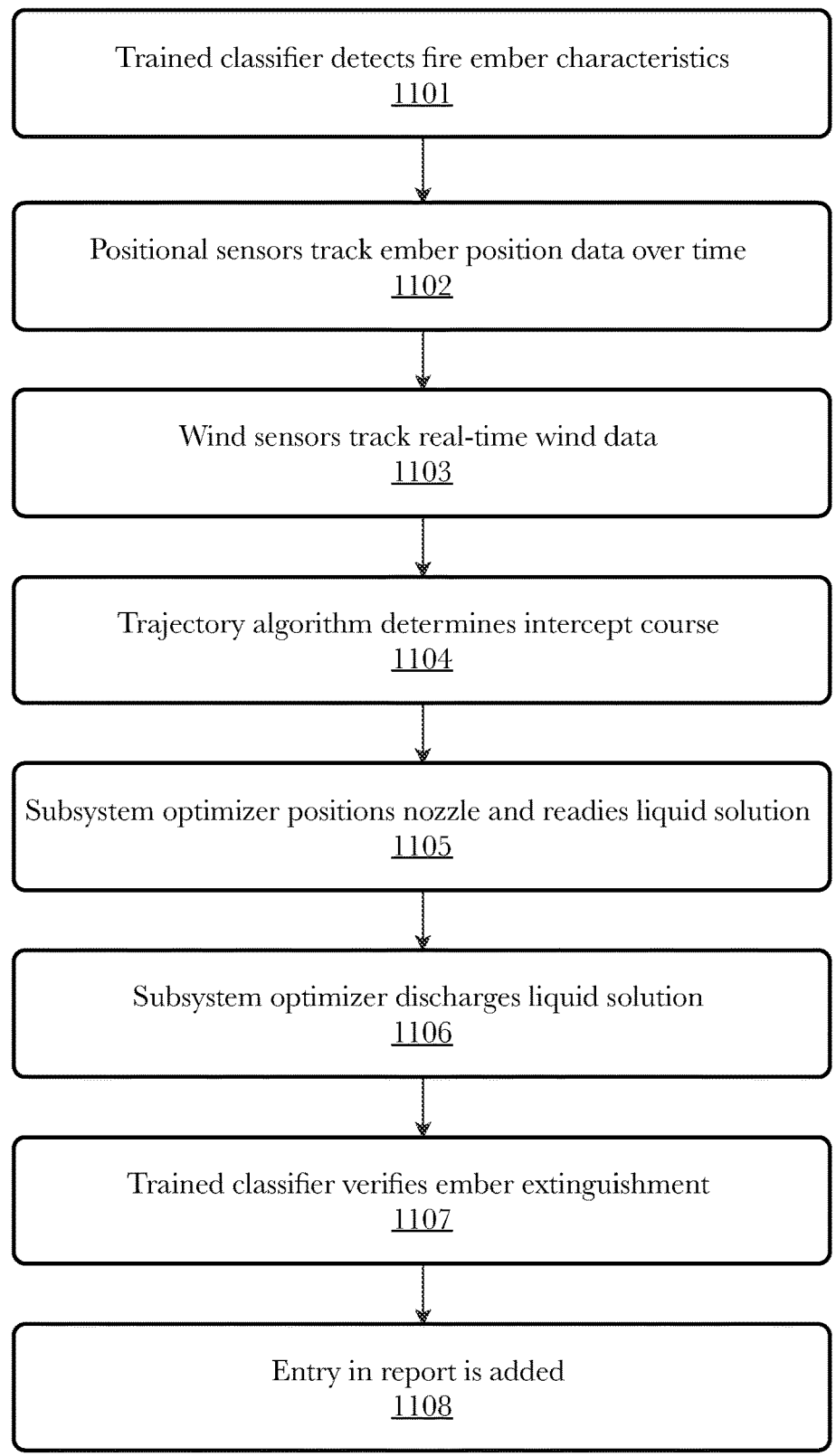
FIG. 11 is a flow diagram illustrating an exemplary machine learning method for fire prevention using minimal resources, according to one aspect.

FIG. 11 is a flow diagram illustrating an exemplary machine learning method for fire prevention using minimal resources, according to one aspect. In a first step 1101, a trained classifier detects a fire ember approaching the protected property. The classifier identifying various characteristics of the ember depending on the type of sensors used. Positional sensors continuously track the ember in a second step 1102 and anemometers feed real-time wind data to the control box 303 in a third step 1103. A trajectory algorithm takes in all sensor data to determine an intercept position for the nozzle 1104. In a fifth step 1005, a subsystem optimizer positions the nozzle and readies the liquid solution. In some embodiments, a liquid solution is mixed in real time when discharged from the unit. In another embodiment, a holding tank stores premixed solution or only water. In a sixth and seventh step the fluid is discharged 1006 and the ember is verified as extinguished or not 1107. In the case that the ember is still a threat, steps 1102-1107 are repeated. In a final step 1108, any available data associated with the detection and extinguishing of the ember is added to a report.

Figure 12:
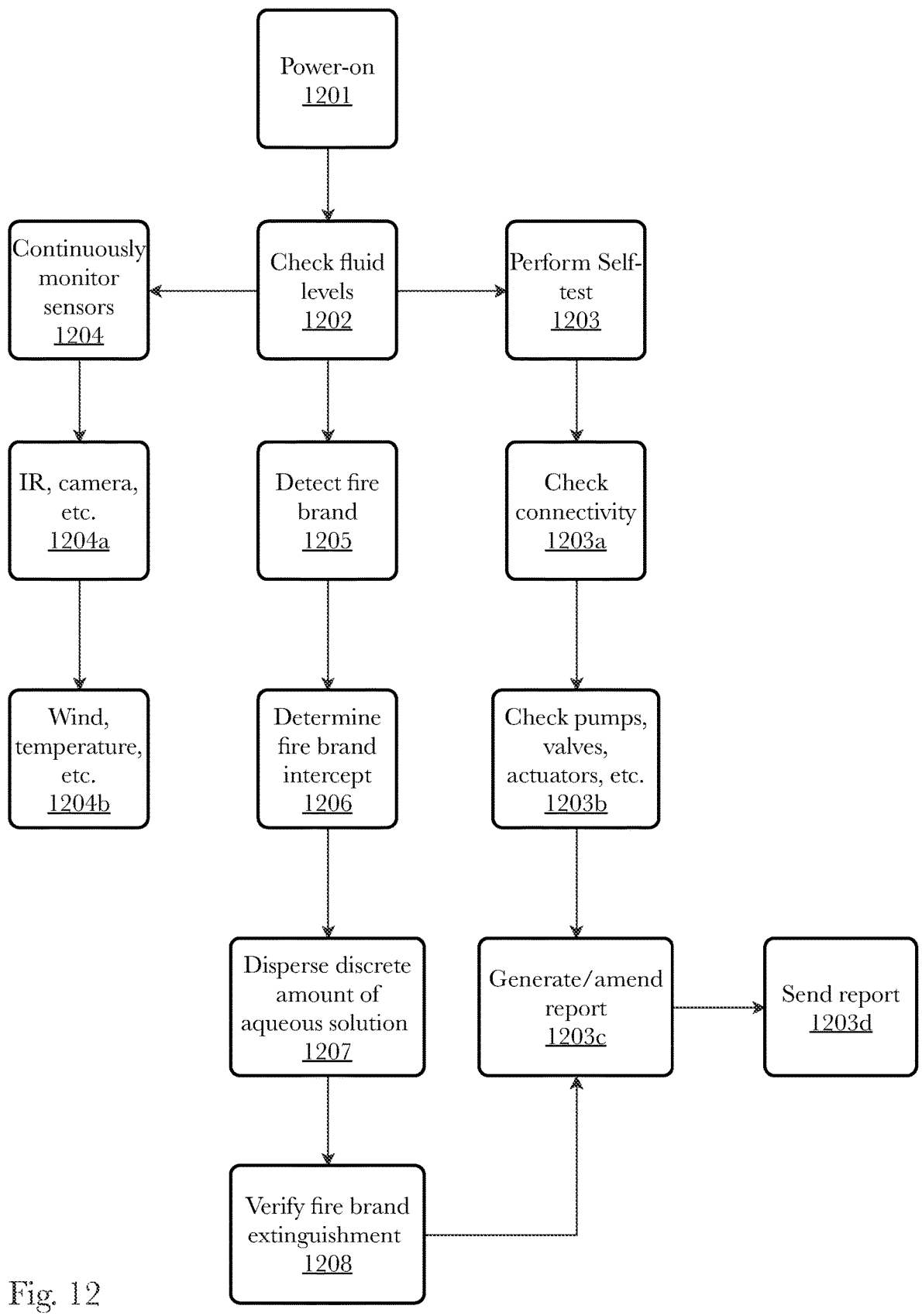
FIG. 12 is a flow diagram illustrating an exemplary method for fire prevention using minimal resources, according to one aspect.

FIG. 12 is a flow diagram illustrating an exemplary method for fire prevention using minimal resources, according to one aspect. In a first step 1201, a fire prevention unit is powered on or resumes from a standby state. A rapid check of the fluid levels is performed in a second step 1202, following with a third self-test step 1203 of the unit's connectivity 1203a and mechanics 1203b that results in a self-test report 1203c. If connectivity is available, reports may be sent periodically or streamed, or stored for sending at a later time if connectivity is yet to be established or is faulty 1203d. Immediately after checking fluid levels 1202, the unit is in operation mode and continuously monitors all connected sensors 1204/1204a/1204b. Upon detection of a firebrand 1205, sensors data is fed into machine learning models that determine the firebrand intercept course or final destination depending on the configuration 1206. Immediately following a successful determination of a future position of the firebrand 1206, the computing device within the fire prevention unit positions the turret and nozzle and dispenses just enough aqueous solution at the right angle and velocity to extinguish the firebrand 1207. The fire prevention unit may then verify firebrand extinguishment 1208 (may use external sensors as well) and amend reports as configured 1203c.

Given the previous figures and descriptions, various use cases are anticipated. The following use cases are—in general—instances where fires may develop and the ability to form a timely and sufficient response is inadequate. For example, a first use case comprises scaling down a fire prevention unit and integrating it into vehicle platforms around hazardous materials. Examples of this are cargo trains or aircraft carrying lithium batteries. Bespoke fire prevention units may be installed on specific cars (in the case of trains) or in luggage compartments (in the case of planes). Additional hazardous vehicle examples are electrical or heat/friction susceptible areas such as brakes on a tractor trailer, especially one making long hauls over mountainous terrain. Recreational vehicles and boats have living/cabin quarters that would also benefit from such an application of the present invention and its various embodiments.

A second use case are commercial applications. Installation of bespoke fire prevention units would be useful in hazardous storage areas, mounted on transmission towers, Forestry Service fire lookouts, windmills, and crypto-mining farms. Additionally, the various embodiments disclosed herein provide a portable-means of fire suppression for military applications. For example, in times of war or during war-training, the military deploys and sets up a temporary data centers of sensitive equipment. While permanent data centers have built-in fire suppression, these mobile data centers suffer from a high-fire risk. Thus, the portability of fire prevention units allow the military to provide sufficient fire protection to sensitive equipment during high risk operations.

Custom installations or bespoke designs of the fire prevention unit may be informed by data that is used to predict wildfire risk with data sets that include ecological, topological, climatic, and ignition-based factors. This data will allow an installation or design team to determine the precise physical placement of where the units will be installed for each application (house, business, vehicle, etc.) with respect to the number of units needed for effective protection. Bespoke designs may need more or less fluid-spray range, pressure, flow, fluid storage tanks, etc. Thus, the size of the fabricated structure to hold fluid resources and other parts that directly impact the capabilities of fluidic discharge, can be designed with reference to each custom application.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 13:
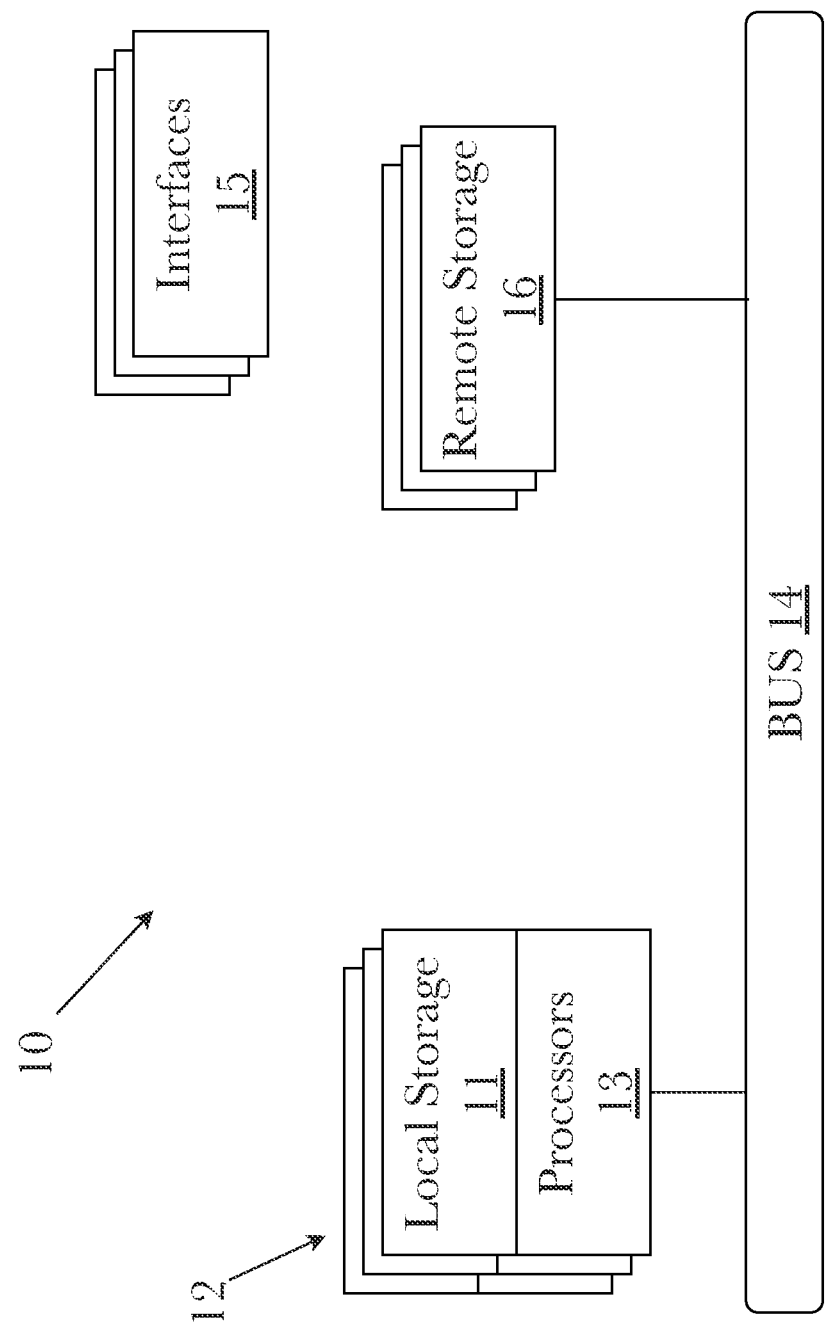
FIG. 13 is a block diagram illustrating an exemplary hardware architecture of a computing device.

Referring now to FIG. 13, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 13 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 14:
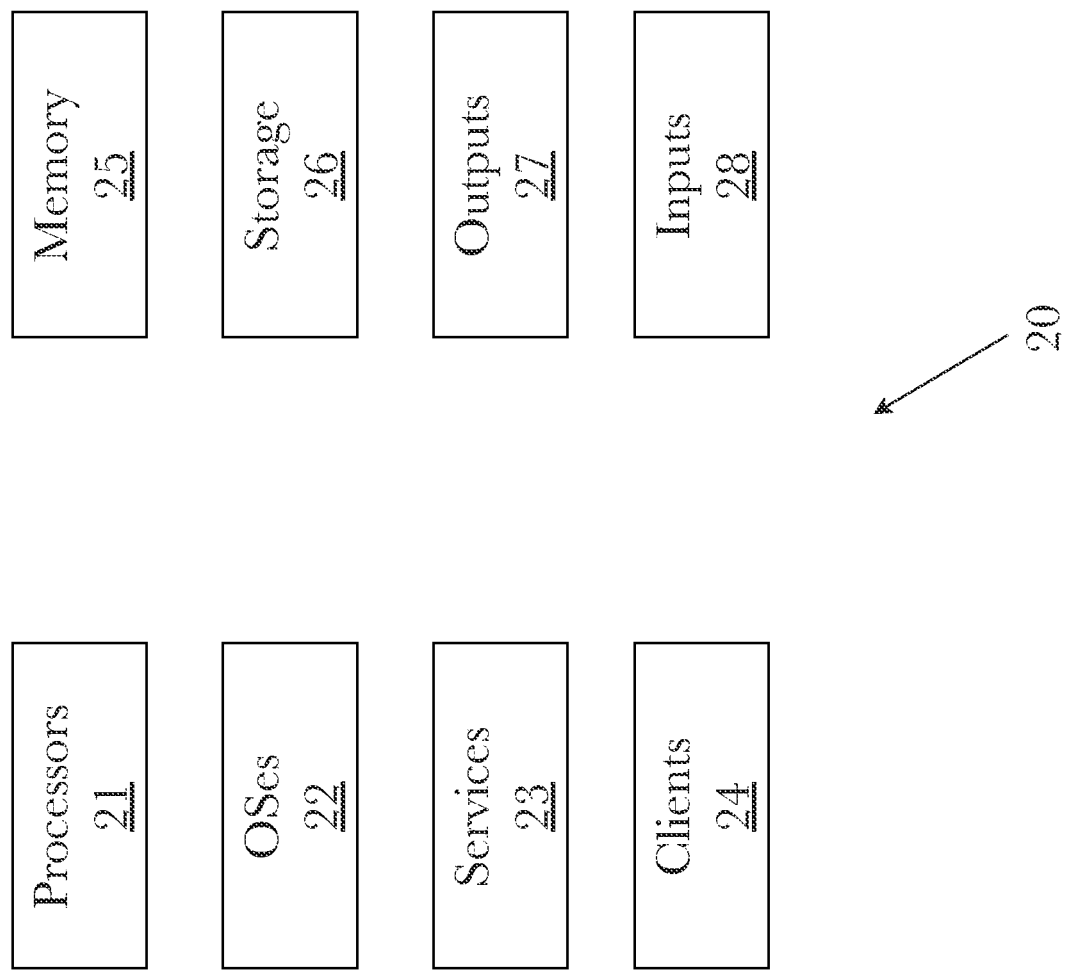
FIG. 14 is a block diagram illustrating an exemplary logical architecture for a client device.

In some aspects, systems may be implemented on a standalone computing system. Referring now to FIG. 14, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 13). Examples of storage devices 26 include flash memory, magnetic hard drive, CD-ROM, and/or the like.

Figure 15:
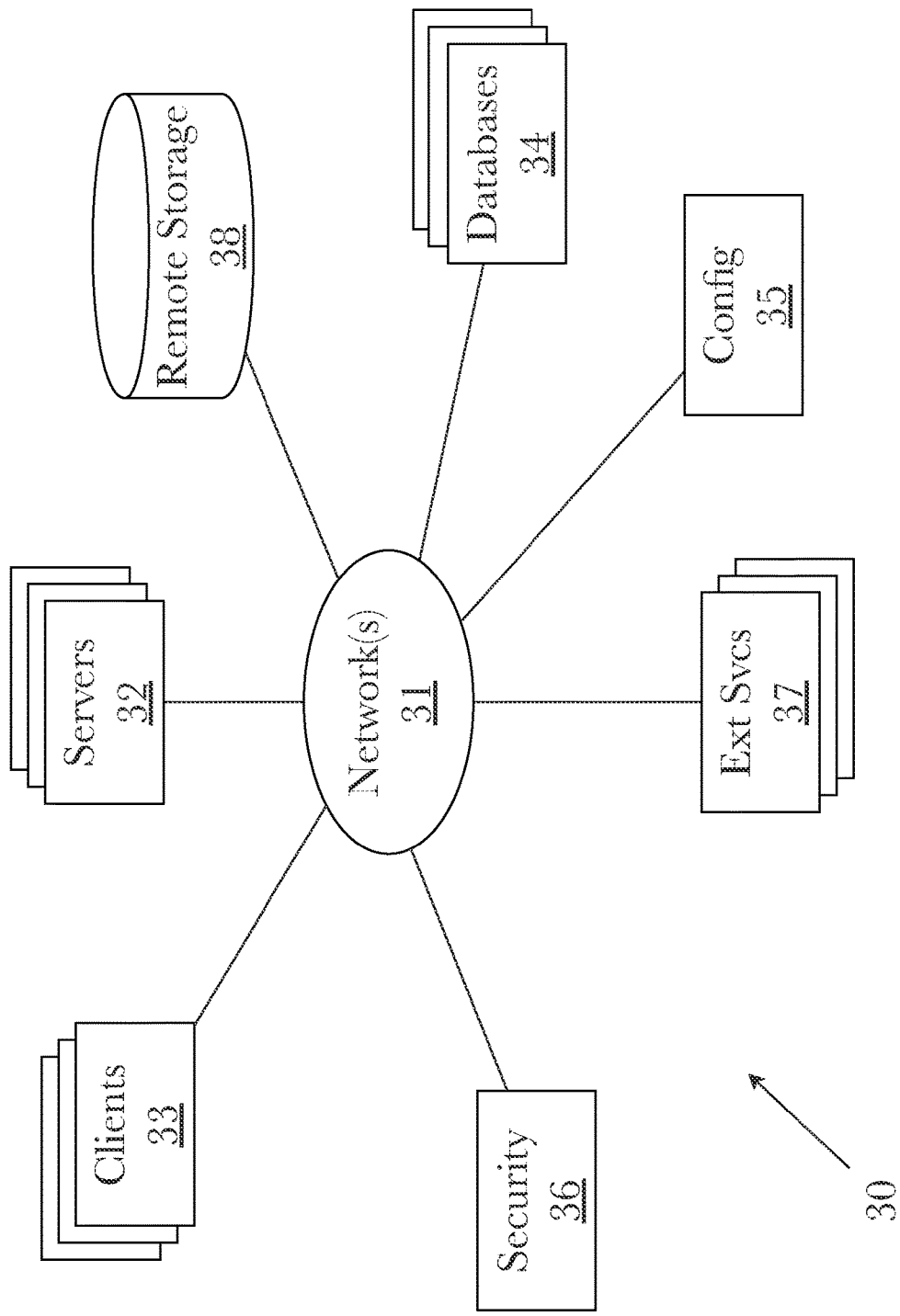
FIG. 15 is a block diagram showing an exemplary architectural arrangement of clients, servers, and external services.

In some aspects, systems may be implemented on a distributed computing network, such as one having any number of clients and/or servers. Referring now to FIG. 15, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth).

In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 16:
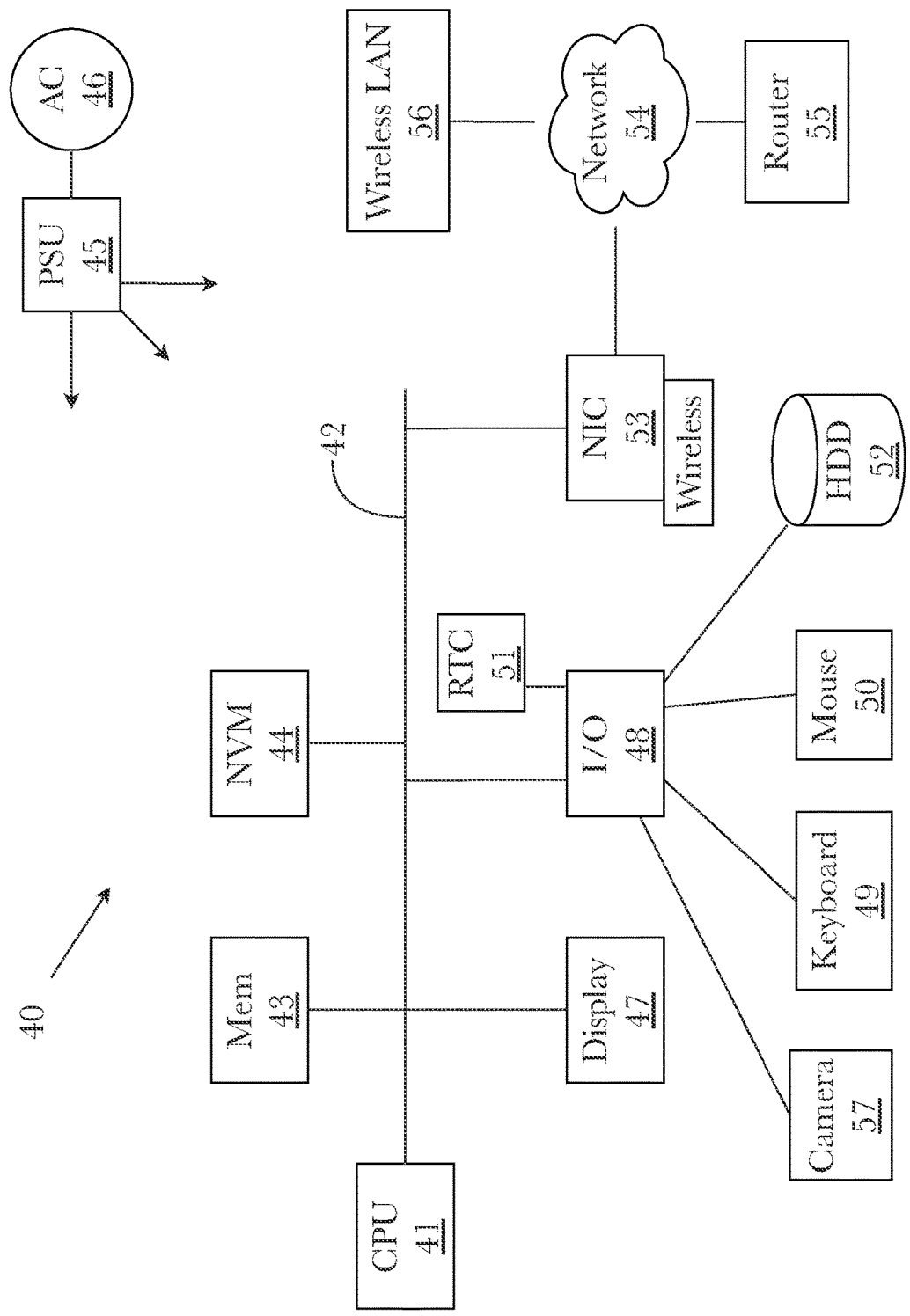
FIG. 16 is another block diagram illustrating an exemplary hardware architecture of a computing device.

FIG. 16 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for protecting an area from fire, comprising:
one or more area fire prevention units, each area fire prevention unit comprising a nozzle, a turret, a control box, and a suppression subsystem comprising at least one tank of fluid;
a first sensor communicatively coupled to a computing device, the first sensor being configured to detect a firebrand and to relay positional data about the firebrand to the computing device;
the computing device communicatively coupled to the first sensor and the one or more area fire prevention units, wherein the computing device is configured to:
detect the firebrand within an area using the first sensor;
determine a trajectory of the firebrand from the positional data about the firebrand data;
determine a final position of the firebrand from the trajectory;
send a signal to the turret of a first area fire prevention unit of the one or more fire prevention units, the signal causing the turret to position a nozzle of the first fire prevention unit toward the final position of the firebrand;
calculate a spread and a distance of a fluid discharge needed to extinguish the firebrand at the final position from the first fire prevention unit;
calculate a nozzle aperture for the nozzle required to make the fluid discharge at the calculated spread and distance;
send a signal to the nozzle, wherein the signal actively configures the nozzle to an appropriate aperture size, according to the calculated spread and distance and the final position;
calculate an amount of fluid needed to extinguish the firebrand based on the calculated spread and distance and the final position;
and discharge the amount of fluid from the suppression subsystem to extinguish the firebrand at the final position.

2. The system of claim 1, further comprising an ember classifier comprising a machine learning algorithm trained to identify embers from data of the type acquired by the first sensor.

3. The system of claim 2, wherein the trajectory and final position are calculated in part using a classification of the firebrand from the ember classifier.

4. The system of claim 2, wherein the amount of fluid is based in part using a classification of the firebrand from the ember classifier.

5. The system of claim 1, further comprising a second sensor communicatively coupled with the computing device, the second sensor being an anemometer which provides real-time wind data to the computing device, wherein the trajectory and final position of the firebrand are calculated in part using the real-time wind data from the second sensor.

6. The system of claim 1, further comprising a model of surrounding terrain stored on the computing device, wherein the trajectory and final position of the firebrand are calculated in part from the model of the surrounding terrain.

7. The system of claim 1, further comprising:

an ember classifier comprising a machine learning algorithm trained to classify embers from data of the type acquired by the first sensor;

a second sensor communicatively coupled with the computing device, the second sensor being an anemometer which provides real-time wind data to the computing device;

a model of surrounding terrain stored on the computing device; and a machine learning algorithm trained to calculate trajectories and final positions of firebrands from a combination of the positional data about the firebrand, ember classifications, real-time wind data, and models of surrounding terrain, wherein the calculation of the trajectory and final position of the firebrand are calculated by the machine learning algorithm using:
- the positional data about the firebrand from the first sensor;
- a classification of the ember from the ember classifier;
- the real-time wind data from the anemometer; and
- the model of surrounding terrain.

8. A method for protecting an area from fire, comprising the steps of:

installing one or more area fire prevention units in the area to be protected, each area fire prevention unit comprising a nozzle, a turret, a control box, and a suppression subsystem comprising at least one tank of fluid;

communicatively coupling a first sensor to a computing device, the first sensor being configured to detect a firebrand and to relay positional data about the firebrand to the computing device;

using the computing device communicatively coupled to the first sensor and the one or more area fire prevention units to:
- detect the firebrand within an area using the first sensor;
- determine a trajectory of the firebrand from the positional data about the firebrand;
- determine a final position of the firebrand from the trajectory;
- send a signal to the turret of a first area fire prevention unit of the one or more fire prevention units, the signal causing the turret to position a nozzle of the first fire prevention unit toward the final position of the firebrand;
- calculate a spread and a distance of a fluid discharge needed to extinguish the firebrand at the final position from the first fire prevention unit;
- calculate a nozzle aperture for the nozzle required to make the fluid discharge at the calculated spread and distance;
- send a signal to the nozzle, wherein the signal actively configures the nozzle to an appropriate aperture size, according to the calculated spread and distance and the final position;
- calculate an amount of fluid needed to extinguish the firebrand based on the calculated spread and distance and the final position;
- and discharge the amount of fluid from the suppression subsystem to extinguish the firebrand at the final position.

9. The method of claim 8, further comprising the step of using an ember classifier to identify embers from data of the type acquired by the first sensor, the ember classifier comprising a machine learning algorithm trained to identify embers from data of the type acquired by the first sensor.

10. The method of claim 9, further comprising the step of calculating the trajectory and final position in part using a classification of the firebrand from the ember classifier.

11. The method of claim 9, further comprising the step of calculating the amount of fluid is based in part using a classification of the firebrand from the ember classifier.

12. The method of claim 8, further comprising the steps of:

communicatively coupling a second sensor with the computing device, the second sensor being an anemometer which provides real-time wind data to the computing device; and calculating the trajectory and final position of the firebrand in part using the real-time wind data from the second sensor.

13. The method of claim 8, further comprising the steps of:

storing a model of surrounding terrain stored on the computing device; and calculating the trajectory and final position of the firebrand in part from the model of the surrounding terrain.

14. The method of claim 8, further comprising the steps of:

using an ember classifier to identify embers from data of the type acquired by the first sensor, the ember classifier comprising a machine learning algorithm trained to identify embers from data of the type acquired by the first sensor;

communicatively coupling a second sensor with the computing device, the second sensor being an anemometer which provides real-time wind data to the computing device;

storing a model of surrounding terrain stored on the computing device; and training a machine learning algorithm to calculate trajectories and final positions of firebrands from a combination of the positional data about the firebrand, ember classifications, real-time wind data, and models of surrounding terrain; and calculating the trajectory and final position of the firebrand using the machine learning algorithm by providing it:
- the positional data about the firebrand from the first sensor;
- a classification of the ember from the ember classifier;
- the real-time wind data from the anemometer; and
- the model of surrounding terrain.

\* \* \* \* \*